(12) United States Patent
Ribeiro et al.

(10) Patent No.: US 10,336,463 B2
(45) Date of Patent: Jul. 2, 2019

(54) AIRCRAFT STALL WARNING/PROTECTION WITH TIME-VARYING MAXIMUM ANGLE OF ATTACK SETTINGS FOR ICING CONDITIONS

(71) Applicant: Embraer S.A., São José dos Campos-SP (BR)

(72) Inventors: Murilo Pinto Ribeiro, São José dos Campos (BR); Gustavo José Zambrano, São José dos Campos (BR)

(73) Assignee: Embraer S.A., São José dos Campos (BR)

( * ) Notice: Subject to any disclaimer, the term of this patent is extended or adjusted under 35 U.S.C. 154(b) by 0 days.

(21) Appl. No.: 15/801,485

(22) Filed: Nov. 2, 2017

(65) Prior Publication Data

US 2019/0127079 A1    May 2, 2019

(51) Int. Cl.
| | |
|---|---|
| *G08B 23/00* | (2006.01) |
| *B64D 43/02* | (2006.01) |
| *B64D 15/22* | (2006.01) |
| *G05D 1/08* | (2006.01) |
| *B64C 13/16* | (2006.01) |
| *B64C 13/50* | (2006.01) |

(52) U.S. Cl.
CPC .............. *B64D 43/02* (2013.01); *B64C 13/16* (2013.01); *B64C 13/503* (2013.01); *B64D 15/22* (2013.01); *G05D 1/0816* (2013.01)

(58) Field of Classification Search
None
See application file for complete search history.

(56) References Cited

U.S. PATENT DOCUMENTS

| | | | |
|---|---|---|---|
| 2017/0060141 A1* | 3/2017 | Leopold | B64C 13/16 |
| 2018/0086431 A1* | 3/2018 | Beaufrere | B64C 5/10 |

* cited by examiner

*Primary Examiner* — Adolf Dsouza
(74) *Attorney, Agent, or Firm* — Nixon & Vanderhye P.C.

(57) ABSTRACT

This non-limiting technology proposes to modify the maximum angle of attack setting ($\alpha_{setting}$) of the Stall Protection or Stall Warning Systems continuously or continually, according to the elapsed time since icing is first detected and/or the deicing system was activated. A changing maximum angle of attack setting maintains approximately the same angle-of-attack margin to the stall angle-of-attack by taking into account improvements in the stall angle of attack due to inflight icing removal and icing prevention by operation of an inflight deicing system. The aircraft flying with an angle of attack closer to the critical angle of attack is capable of producing a higher coefficient of lift.

20 Claims, 12 Drawing Sheets

AIRCRAFT STALL WARNING/PROTECTION WITH TIME-VARYING MAXIMUM ANGLE OF ATTACK SETTINGS FOR ICING CONDITIONS

CROSS-REFERENCE TO RELATED APPLICATIONS

None.

STATEMENT REGARDING FEDERALLY SPONSORED RESEARCH OR DEVELOPMENT

None.

FIELD

The technology herein relates to aircraft stall warning/protection systems, and more particularly to devices, systems, methods and flight control laws which warn the pilot of and/or limit the aircraft from entering aerodynamic stalled regions when flying in icing conditions.

BACKGROUND & SUMMARY

When an aircraft flies through cold moist air, ice can build up on the aircraft wing leading edges and other aerodynamic surfaces. Ice accretions can alter the airflow over the wings and tail, reducing the overall lift force and potentially causing aerodynamic stall—a condition that can lead to temporary loss of control of the aircraft.

The imminent threat of aerodynamic stall due to icing and other factors has led regulatory agencies, such as the Federal Aviation Administration (FAA), to require aircraft manufacturers to incorporate methods, systems, and devices into aircraft to protect against and prevent both (a) excessive icing and (b) aerodynamic stall.

Ice Prevention

Ice can be visually detected by the pilot, but most modern aircraft have one or more ice detector sensors that warn the flight crew of icing conditions. In some aircraft models, multiple ice detectors are used, and the ice detection system automatically turns on anti-ice systems and modifies stall warning and stall protection systems when ice is detected.

There are many ways to remove and/or prevent ice buildup during flight. For example, certain Embraer aircraft use hot bleed air from the jet engines to melt or prevent ice formation on the wings and other surfaces. See e.g., Embraer 135/145 Ice and Rain Protection.

Stall Warning and Protection Systems

A Stall Warning System warns the pilot, often audibly and visually, that the aircraft is on the verge of entering aerodynamic stall. As explained in detail below, an automatic system can compare certain measured flight parameters (i.e., angle of attack) to a threshold (i.e., maximum angle of attack setting) to determine when an aircraft is close to aerodynamic stall. Some aircraft warn the pilot of an imminent stall by rapidly shaking the yoke or stick. If the pilot takes no immediate action, then a processor or other control circuit may actuate some servo on the control column to force the nose of the aircraft down to prevent stalling.

A Stall Protection System uses flight envelope protection, which is an automatic control system that actuates the aircraft flight control surfaces to prevent the pilot from making control commands that would force the aircraft to exceed its aerodynamic operating limits and enter a stalled region. This system also protects the aircraft from atmospheric disturbances (such as gusts and wind shears) that could drive the aircraft into the stalled region.

Stall Warning/Protection Based on Icing

Stall Warning and Stall Protection Systems are also operative while flying in icing conditions. When any ice detector detects ice, an anti-icing system is activated (usually automatically) to melt the ice and prevent further ice formation. The ice detectors also send a signal to a Stall Warning or Stall Protection System, which reduces its maximum angle of attack setting to prevent the airplane from flying into the stalled region when the aircraft aerodynamic characteristics is degraded by ice.

BRIEF DESCRIPTION OF THE DRAWINGS

The following detailed description of exemplary non-limiting illustrative embodiments are to be read in conjunction with the drawings, of which.

DETAILED DESCRIPTION OF NON-LIMITING EMBODIMENTS

Angle of Attack and Stall

Figure 1A:
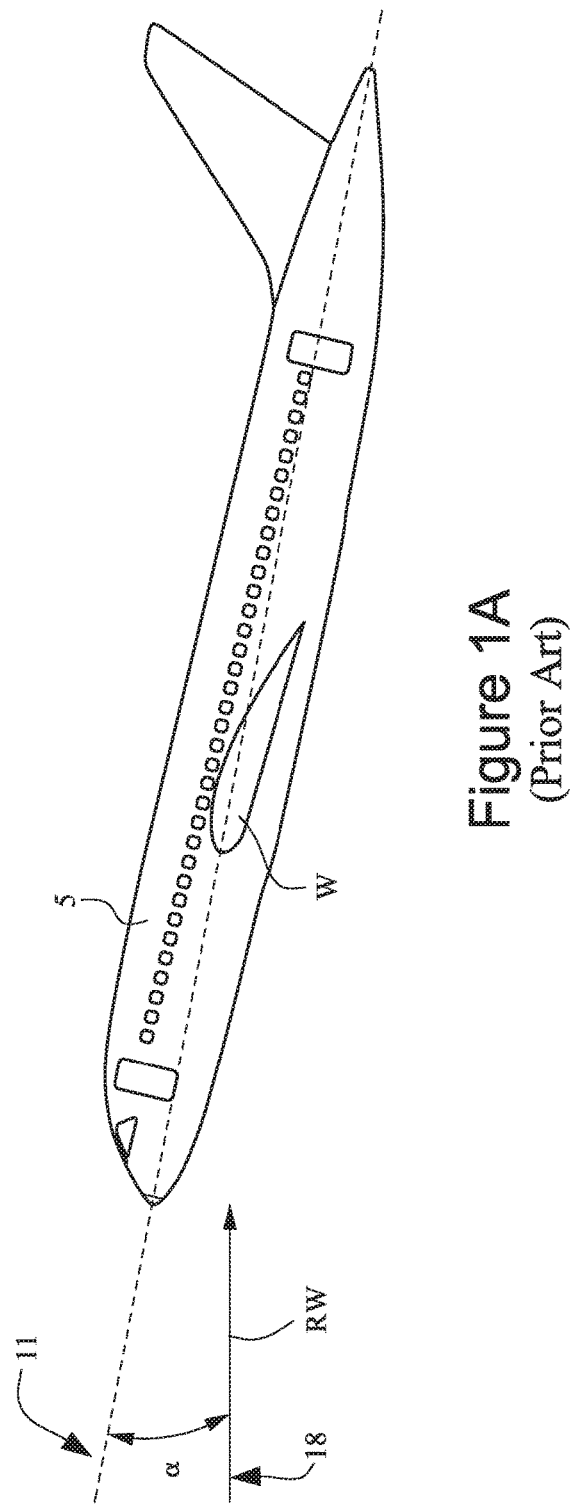
FIG. 1A shows an example aircraft in flight.

FIG. 1A shows an aircraft 5 with a wing W. FIG. 1A also shows that the "angle of attack" (AOA) is defined as the angle α between a reference body axis 11 and the relative wind RW. The reference axis 11 may be defined relative to the wing W or the fuselage centerline.

Figure 1B:
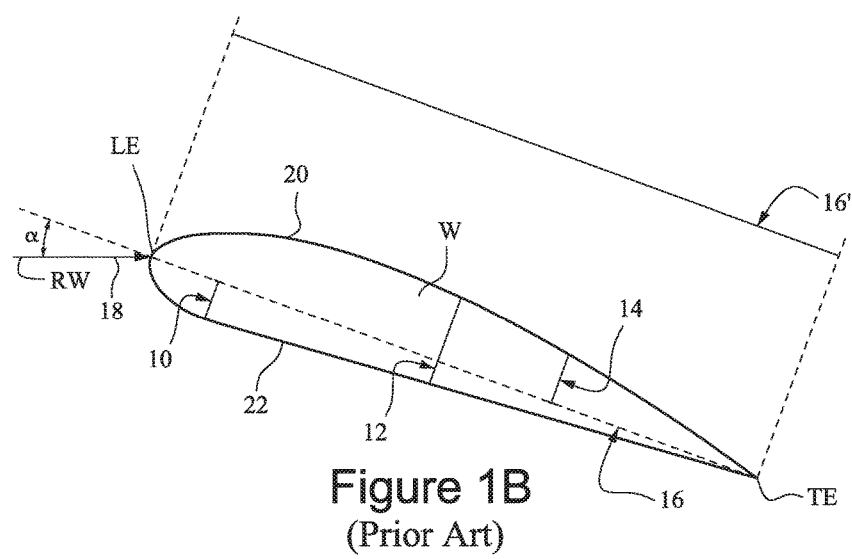
FIG. 1B shows an example wing section.

FIG. 1B shows a non-limiting example of a profile view of wing W. The wing W has an upper wing surface 20 and a lower wing surface 22, and is asymmetrically divided into two sections by the Chord Line 16, wherein the two sections 14, 10 are defined by the Upper Surface 20, and the Lower Surface 22, respectively. The Chord Length 16' represents the length of the chord line 16 while the Thickness 12 represents the distance between upper and lower surfaces 20, 22. The front side of wing W is known as the Leading Edge LE, while the rear side of the wing is known as the Trailing Edge TE.

The Lift force that acts in wing W is a function of aircraft airspeed, air density, wing area and angle of attack (AOA or $\alpha$). The amount of lift wing W produces thus depends on the relative angle that the airstream has to the wing. The wing W generates more lift as this angle, known as the angle of attack, increases. Lift is generated because air flows faster over the upper wing surface 20 than over the lower wing surface 22, generating a pressure difference that produces a net force in the upward direction.

Figure 1C:
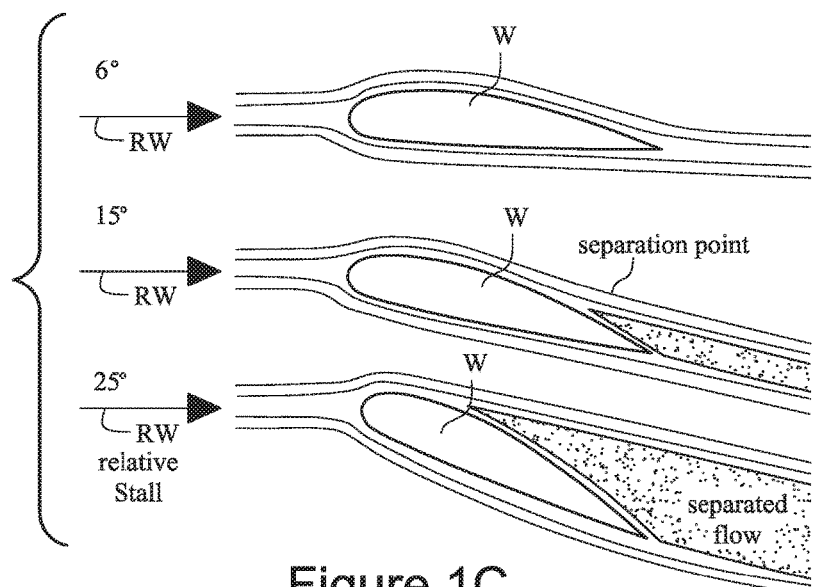
FIG. 1C shows an example flow separation over a wing section.
Figure 1D:
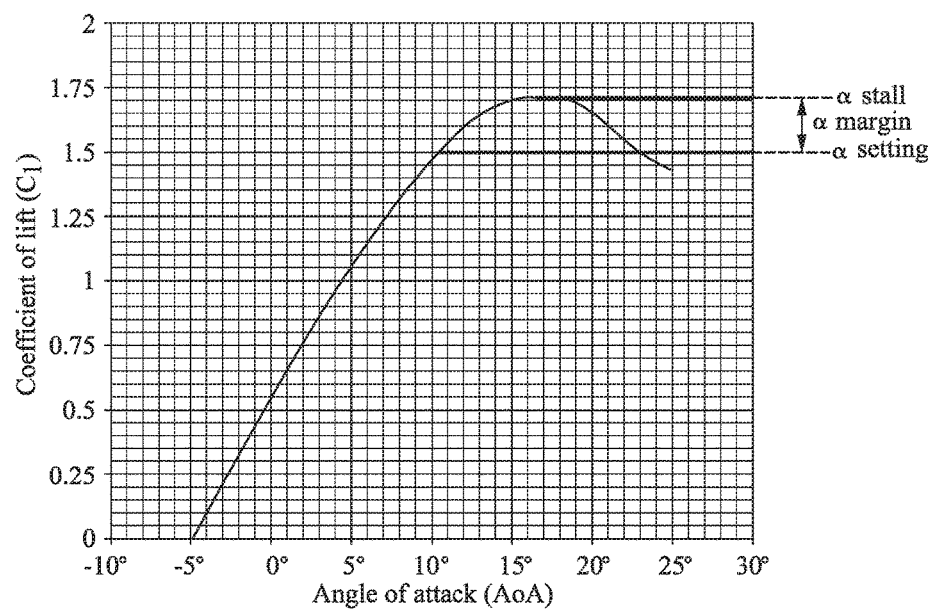
FIG. 1D shows an example graph of angle of attack (AOA) versus coefficient of lift ($C_L$).

In general, the greater the angle of attack, the more lift is generated by the wing. However, this is only true to a certain point. The stall angle of attack ($\alpha_{stall}$) is the critical angle at which significant flow separation occurs over the wing W (see FIG. 1C), causing reduction in lift produced. In the example of FIGS. 1C and 1D, at 6°, there is no separation point in the flow and at 15° the stall angle of attack ($\alpha_{stall}$) is achieved. Angles of attack just below the stall angle of attack generate maximum lift (see FIG. 1D). Angles of attack with values greater than 15° would produce less lift (see FIG. 1D) and would cause the aircraft to enter an aerodynamic stall region—meaning that the aircraft is no longer able to maintain its flight path.

To prevent stalls in an automatic flight control context, an operative parameter is the maximum angle of attack setting ($\alpha_{setting}$). Stall protection and warning systems use the maximum angle of attack setting as the maximum boundary comparison point. A different maximum angle of attack setting (e.g., determined by wind tunnels and test flights for the worst ice conditions possible) can be used when icing is detected.

The maximum angle of attack setting is typically not set at the stall angle of attack, because it is desirable to maintain a safety margin from the stall angle of attack. The difference between the stall angle of attack and the maximum angle of attack setting ($\alpha_{stall}-\alpha_{setting}$) is called the angle of attack margin ($\alpha_{margin}$). This gap or difference between stall angle of attack and maximum angle of attack setting is the margin pilots and automatic flight control systems use to prevent the aircraft from entering aerodynamic stall.

Stall Warning and Protection Systems

In order to prevent the aircraft from flying in a stalled region (prevent $\alpha>\alpha_{stall}$), certification authorities (such as the Federal Aviation Administration in the United States) require that the aircraft manufacturer demonstrates that either:

1) There is a tactile, audible and visual warning that an aircraft is approaching the stall angle of attack with enough of margin such that the pilot may take an action to avoid entering the stalled region. This device is called the Stall Warning System 212; or 2) The subject aircraft has an effective and robust Stall Protection System 218 which automatically commands control surfaces (such as elevator and horizontal stabilizer deflection) to deprive the pilot from achieving an angle of attack that is inside the stalled region. This system also protects the aircraft from atmospheric disturbances (such as gusts and wind shears) that could drive the aircraft into the stalled region.

Both systems have a maximum angle of attack setting ($\alpha_{setting}$) which by definition is below the stall angle of attack ($\alpha_{stall}$). The angle of attack margin ($\alpha_{margin}$) provides enough warning margin for the pilot to react (alerted by the Stall Warning System), and robustness to pilot input or atmospheric disturbances (Stall Protection System).

When flying in icing conditions, ice accretions may deteriorate the aerodynamic characteristics of the wings. Consequently, the stall angle of attack ($\alpha_{stall}$) decreases due to icing, and the maximum angle of attack setting ($\alpha_{stall}$) is reduced to take into account icing effects. In many prior approaches, the maximum angle of attack setting is a constant for a given condition. For example, upon detecting ice 200, a worst case maximum angle of attack setting is often used to provide a sufficient margin to avoid stall in worst case icing conditions. As a result of this inflexibility, there is a loss in efficiency in the landing operational procedures. To make up for a lower angle of attack, the aircraft must travel faster in order to produce the same amount of lift. This requires the use of more runway to fully stop the aircraft. In short, an assigned maximum angle of attack setting directly affects the landing performance of the aircraft.

A New Approach

This non-limiting technology proposes to continuously or continually modify the maximum angle of attack setting ($\alpha_{setting}$) of the Stall Protection and/or Stall Warning Systems according to how much time has elapsed since ice was detected and/or the deicing system was first activated.

The non-limiting technology herein provides a changing maximum angle of attack setting which always maintains approximately the same angle-of-attack margin to the stall angle-of-attack. As the margin remains approximately the same and the system thus takes into account improvements in the stall angle of attack due to inflight icing removal and icing prevention by operation of an inflight deicing system, the aircraft flying with an angle of attack closer to the critical angle of attack ($\alpha_{stall}$) is capable of producing a higher coefficient of lift. Furthermore, the aircraft is not required to fly at a faster speed to produce the same amount of lift. As a direct result of this slower speed, the landing operations would benefit from a shorter runway requirement to stop the aircraft.

Stall Warning and Protection and Deicing Systems—Detailed Description

Figure 2A:
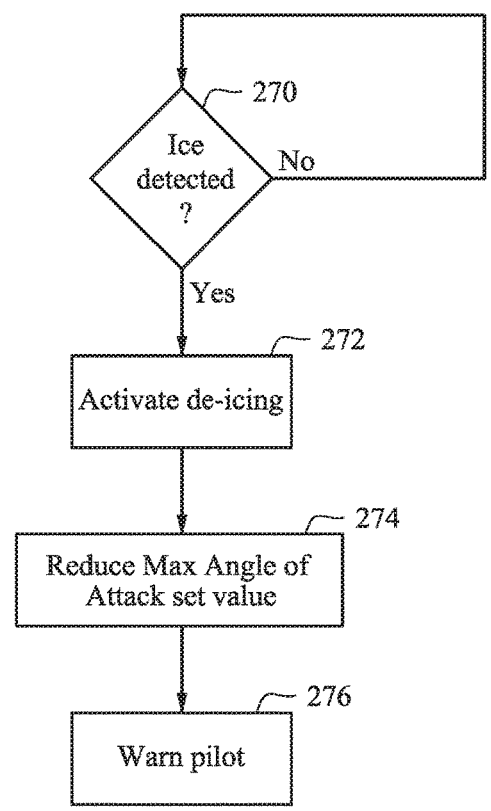
FIG. 2A is a flowchart that follows the ice detection logic executed by an aircraft onboard computer.
Figure 2B:
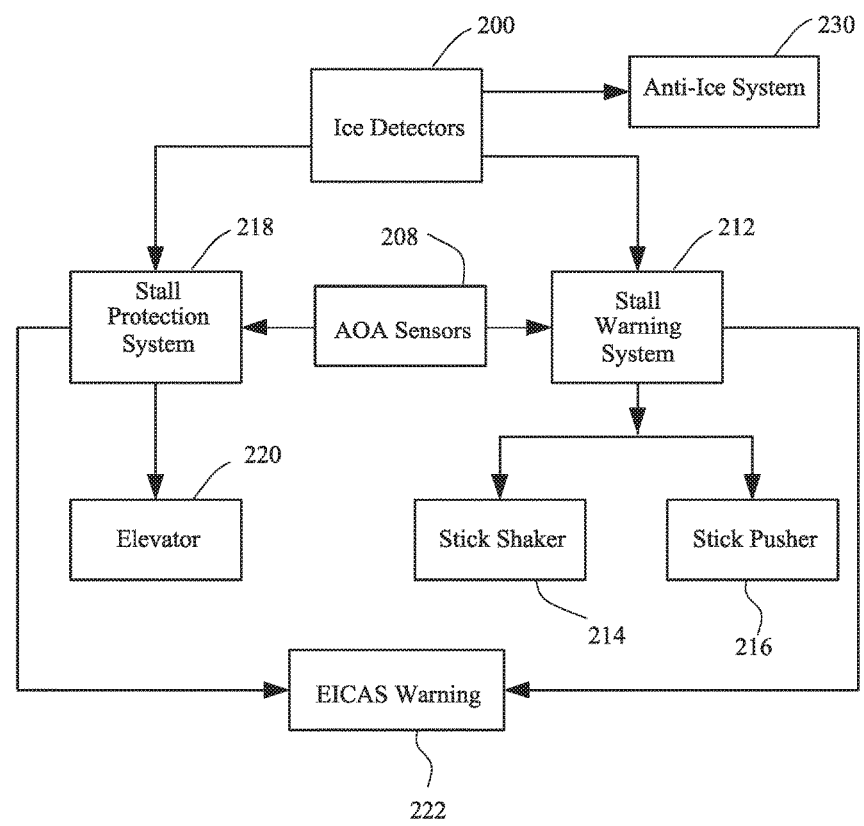
FIG. 2B is a schematic block diagram of an example aircraft Stall Protection and Stall Warning working in conjunction with an Anti-ice System.
Figure 2C:
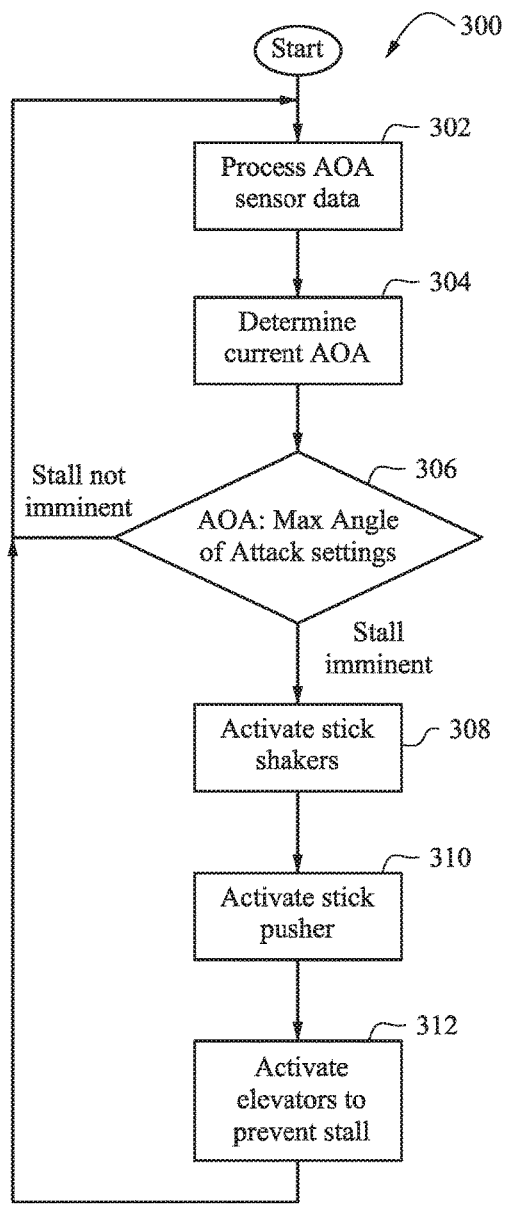
FIG. 2C shows an example prior art control flow executed by an onboard computer(s).

FIGS. 2A, 2B and 2C show a non-limiting example prior art Stall Warning System 212 or Stall Protection System 218 working in conjunction with an Anti-ice System 230 which is the basis for an improvement to be described below.

The Stall Warning 212 or Stall Protection 218 system processes the AOA sensor 208 data (FIG. 2C, 302) to determine current angle of attack (304), and compares it against a maximum angle of attack setting (306). If this comparison reveals that a stall condition is imminent (306), the Stall Warning system 212 first actuates the stick shakers 214 (308) in an attempt to warn the pilots, and disengages the autopilot. If no corrective actions are taken and the aircraft is on the verge of entering a stall due to its high angle of attack, the stick pusher is actuated 216 (310), automatically pitching the nose of the aircraft down as to avoid a stall. The stall protection system 218 may also compare the current alpha (AOA) with a maximum angle of attack setting to actuate the elevators 220 (312) in order to prevent the airplane from entering an aerodynamic stall.

When flying in icing conditions, ice accretions may deteriorate the aerodynamic characteristics of the wing W. Consequently, the stall angle of attack ($\alpha_{stall}$) is reduced. This means that an automatic control system 212 or 218 should adapt the maximum angle of attack setting for icing conditions if it is to be effective in warning/protecting against stalls during icing conditions.

When the aircraft's Icing Detection System 200 detects that the aircraft is flying in icing conditions (FIG. 2A, 270), it sends a signal to the anti-icing system 230 and to the Stall Warning/Protection System 218, causing the bleed air anti-icing system 230 automatic mode to activate (272) and a Stall Warning/Protection System maximum angle of attack set value reduction (274). An advisory message may be presented on the Engine Indication Crew Alerting System ("EICAS") 222 to indicate that the ice has been detected and that the Stall Warning or Protection System has changed its angle of attack settings accordingly (276).

Once activated, the anti-icing system 230 generates heat at the leading edges of the wings, eliminating any ice that has accreted on protected surfaces and preventing further ice accretion on the protected areas of the aircraft. However, the anti-icing system 230 does not protect the surface of the entire aircraft from ice accretions, although it reduces significantly the aerodynamic deterioration that would occur if there were no anti-icing system. The anti-icing system 230 is also not capable of instantly preventing or eliminating the ice—it requires some time after activation before it reaches thermal equilibrium at an adequate temperature.

Similar certification requirements regarding stall characteristics, stall protection and stall warning margin apply for operation in icing conditions. These requirements demand the demonstration of satisfactory flying qualities characteristics in the following icing conditions:

"Normal Operation Ice"—Ice accumulated during take-off, en-route and holding conditions resulting from the operation of the anti-icing system 14.

"Pre-Activation Ice"—Transient ice which accumulates from the moment the Ice Detection System detects the ice formation to the moment which the anti-icing system achieves thermal equilibrium and is fully operational 12.

Figure 3:
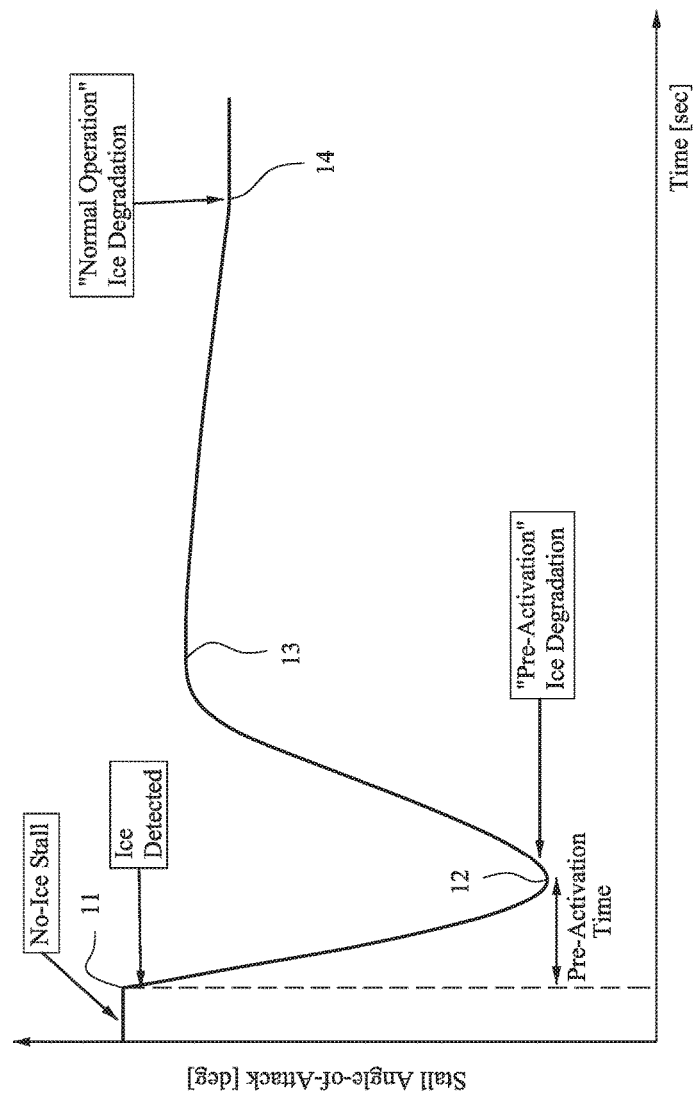
FIG. 3 illustrates an example of how aerodynamic stall angle of attack can degrade over time once the accretion of ice over the aircraft begins.

FIG. 3 graphically illustrates how the aerodynamic stall angle of attack ($\alpha_{stall}$) degrades over time after the aircraft enters icing conditions at point 11. From 11 (when ice is first detected) to 12 (when the de-icing system is fully operational and has reached thermal equilibrium), ice continues to form on the leading edges of the wings W. From point 12 (when the anti-icing system is fully operational and is in a state of thermal equilibrium) to 13, the system progressively de-ices the protected surfaces of the aircraft and the stall angle of attack improves accordingly. From point 13 to 14, even though the portions of the aircraft protected by the deicing system are not degrading aerodynamically due to icing, ice continues to accrete on the unprotected parts of the aircraft, until point 14 (maximum normal operation ice accretion while the aircraft is operating in icing conditions).

The pre-activation ice 12 may have a greater aerodynamic degradation than the normal-operation ice 14 because ice accretion occurs not only in the unprotected parts of the wings, but also on the entire leading edges of the wings. The aerodynamic degradation for pre-activation and normal operation ice conditions are obtained from aerodynamic wind-tunnel tests and confirmed by flight testing the aircraft.

Figure 4:
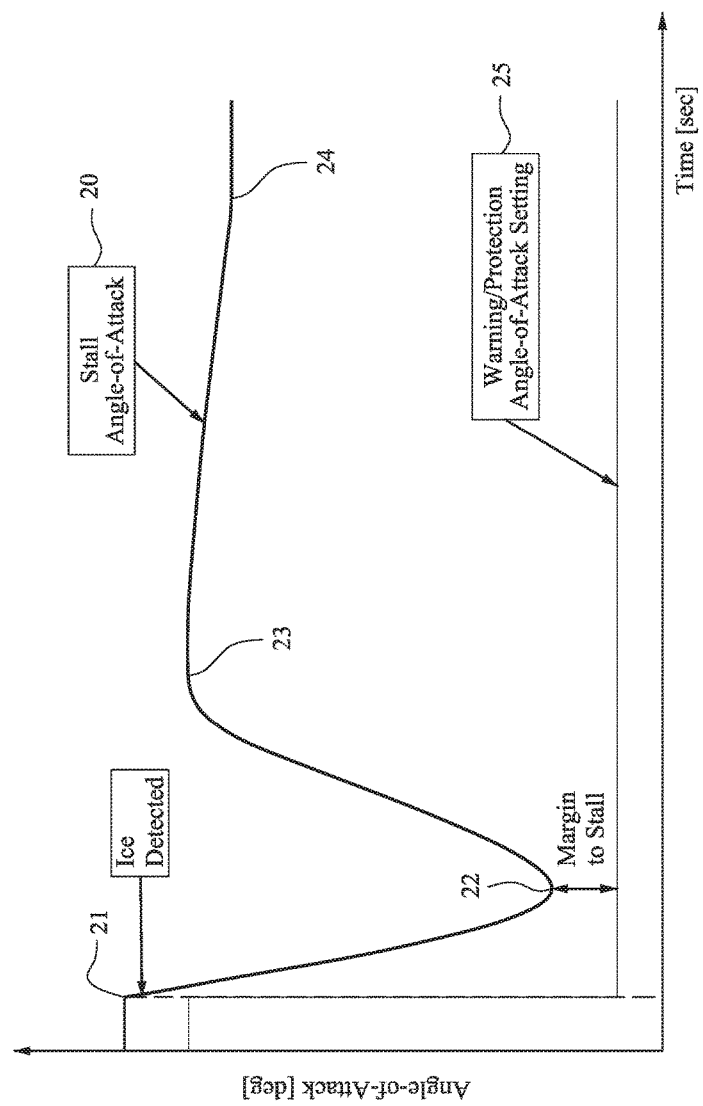
FIG. 4 illustrates example prior art angle of attack settings of prior Stall Warning and Stall Protection Systems. When ice is detected, the angle of attack setting is decreased to a value that covers the most critical ice accretion. This reduction in maximum angle of attack impacts operational landing speeds and deteriorates landing performance.

FIG. 4 shows that the current Stall Warning and Stall Protection systems are designed to cover the worst case scenario of aerodynamic deterioration 22 after the ice is detected 21. When ice detectors detect ice, current Stall Warning and Stall Protection Systems are configured to readjust for a lower maximum angle of attack setting ($\alpha_{setting}$) 25, which is calculated to cover the worst-case scenario of aerodynamic deterioration caused by pre-activation ice accretions on the wing leading edges.

Certification requirements pose a minimum margin ($\alpha_{margin}$) between the stall warning/protection angle of attack setting and the aircraft operational landing speed. Therefore, when the angle of attack setting of the Stall Warning and Stall Protection System is modified due to the sensed icing conditions, the approach and landing speeds in icing conditions must be increased. In more detail, the ice accretions lead to a smaller coefficient of lift and as a result the aircraft is required to increase its airspeed in order to produce the same amount of lift. As the landing speed increases, the aircraft's landing performance is adversely affected.

As a result, when the pre-activation ice 22 has a greater aerodynamic degradation than the normal operation ice 24, the resultant angle of attack settings 25 and the consequent operational landing speeds will be impacted by this short-time and transient condition.

Continuous Modification of Maximum Angle of Attack Setting

The present of non-limiting technology proposes to modify the maximum angle-of-attack setting ($\alpha_{setting}$) of the Stall Protection and/or Stall Warning Systems continuously or continually, according to the time that has elapsed since the moment (a) ice detector(s) 200 detected ice and/or (b) the deicing system was activated e.g., in response to detection of ice.

Figures 5, 8:
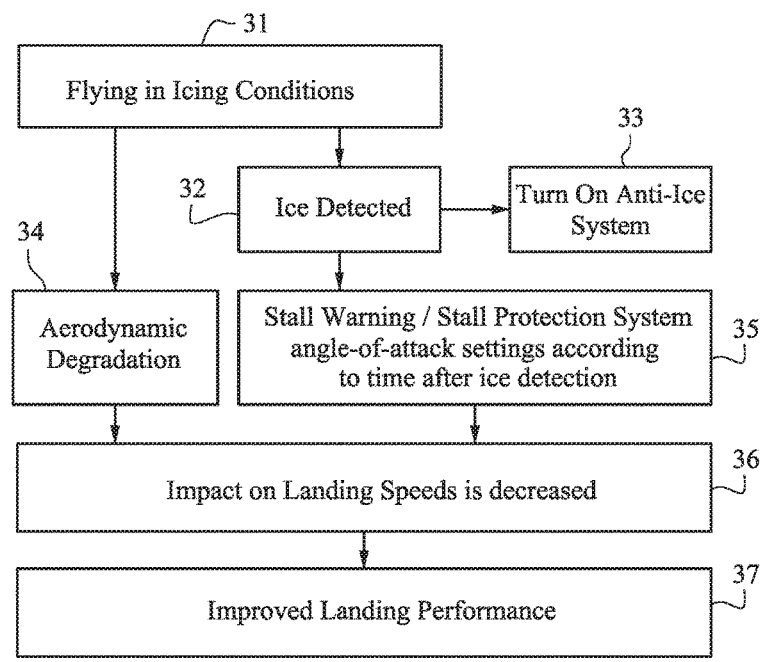
FIG. 5 is a schematic diagram showing non-limiting control technology, which improves landing performance on icing conditions through modifications in the angle of attack settings of a Stall Warning and/or Stall Protection System.
FIG. 8 shows an example way to determine maximum angle of attack setting as a function of time after ice is detected.
Figure 5A:
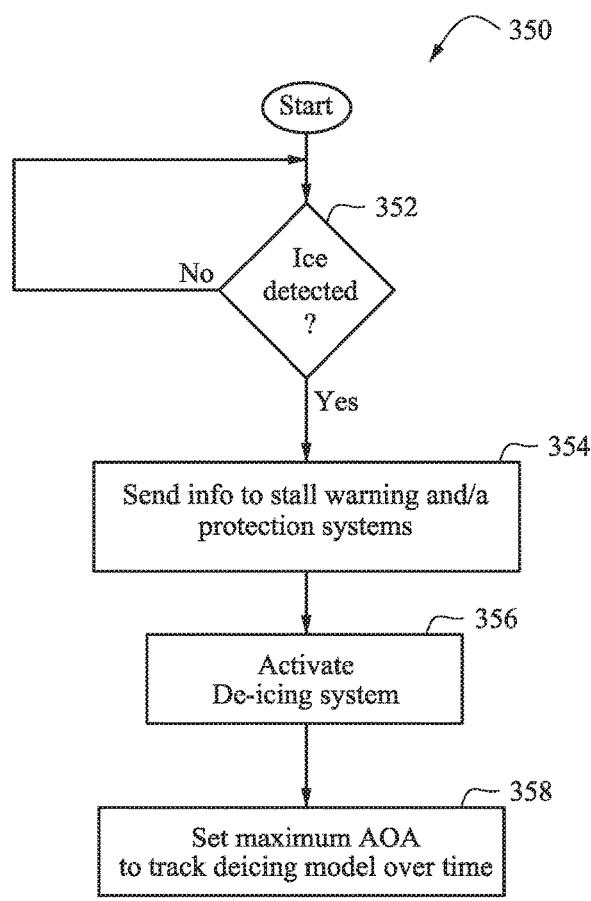
FIG. 5A shows an example non-limiting control flow executed by an onboard computer(s).

FIGS. 5 and 5A illustrate the modifications in Stall Warning and Stall Protections Systems that are described in this non-limiting technology. FIG. 5 shows a system that can be implemented using the FIG. 2B architecture, with one or more computer processes executing instructions stored in non-transitory memory. When flying in icing conditions 31, the Ice Detection System 200 detects that the airframe is contaminated by ice accretions (32, 352) and sends this information to the Anti-Icing System 230 (33, 356) and to Stall Warning and/or Stall Protection Systems 212, 218 (35, 354).

Figure 6:
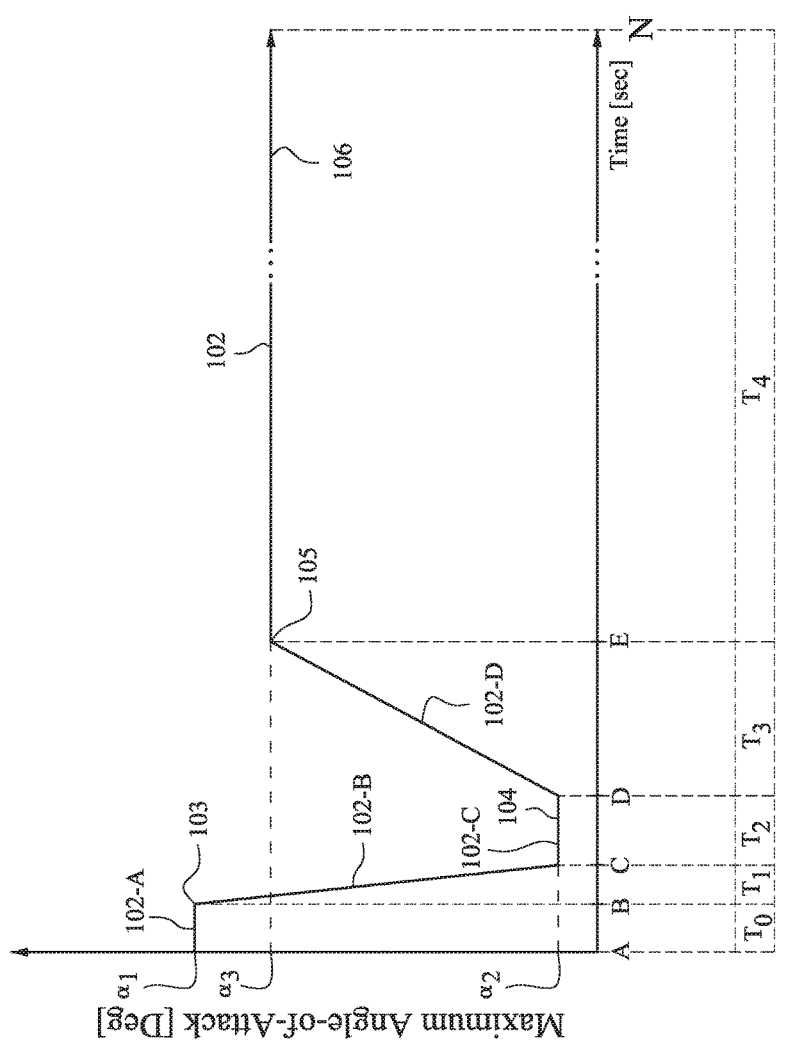
FIG. 6 shows an example warning or protection angle of attack setting calculated and modeled according to this non-limiting technology. The angle of attack setting 45 of Stall Warning and/or Protection Systems is a function of the time after the ice was detected 41 and is calculated to always maintain approximately the same angle of attack margin to the stall angle of attack 40.
Figure 7:
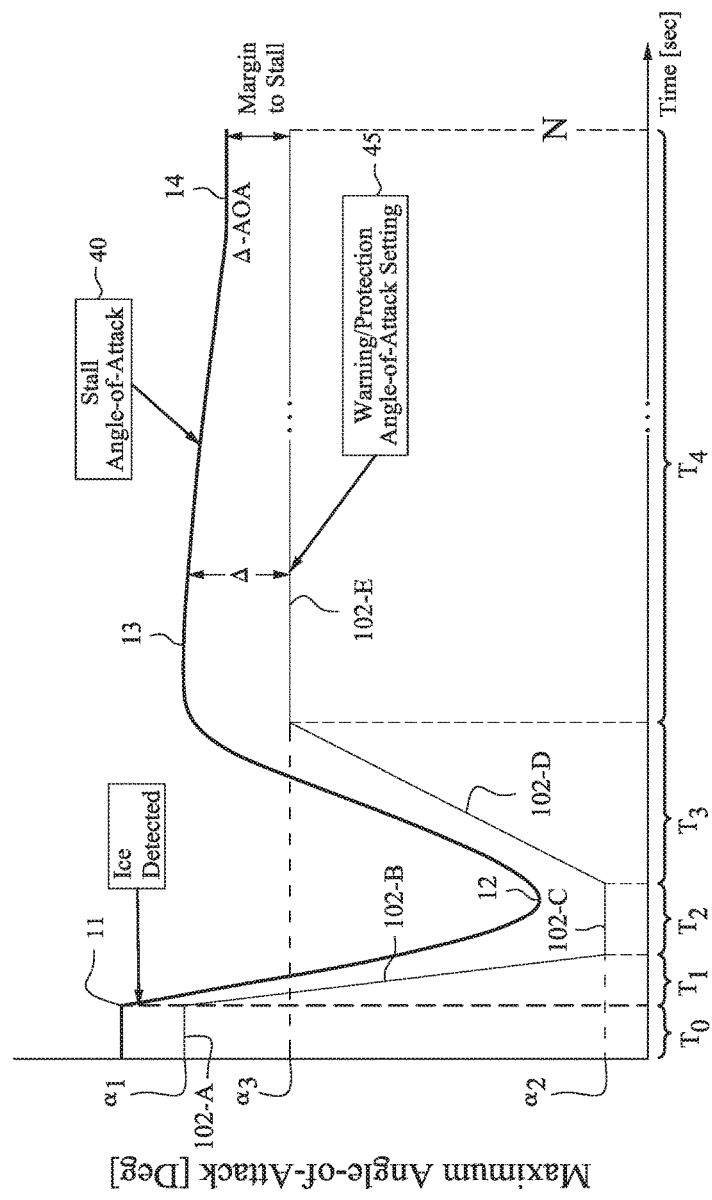
FIG. 7 shows FIG. 6 superimposed onto FIG. 3.

FIGS. 6 and 7 show that the maximum angle of attack setting of the Stall Warning and Protection Systems 212, 218 is a function of the time after the ice was detected and is calculated or otherwise determined to always maintain approximately the same angle of attack margin to the stall angle of attack.

One example non-limiting embodiment sets the maximum angle of attack setting to track a deicing model constructed empirically through tests in wind tunnels and flights in icing conditions (358). The system is capable of constantly readjusting the maximum angle of attack setting in a controlled fashion. As FIG. 7 shows, it is configured to decrease the maximum angle of attack setting as the stall angle of attacks degrades due to the ice accretions but also to increase the maximum angle of attack setting as the stall angle of attack improves due to deicing of protected surfaces.

When the ice detection 200 signal causes the deicing system 230 to turn on (either automatically or through a pilot's response to an icing warning), it takes some time for the deicing system to activate, come up to temperature, start melting accreted ice, and clear the ice accretions that have already formed on protected surfaces. During this time, the maximum angle of attack setting remains conservatively set for worst case icing (see FIGS. 6 and 7 102-C during time period T2).

The actual stall angle of attack during this time can vary based on the severity of icing. The illustrative embodiments do not make an attempt to sense this variation. Rather, the system—like prior art approaches—simply reduces the maximum angle of attack setting to a conservative level (determined by analysis, wind tunnel and flight testing) that will protect against stall even in the event of the most severe ice conditions. Other embodiments that attempt to sense icing severity are also possible.

In a following time interval T3, the deicing system has reached thermal equilibrium and is now able to deice the wing leading edges and other protected areas at a rate greater than the ice accretion rate. This melting of already-accreted ice improves the stall angle of attack. In order to keep a substantially constant angle of attack margin to the improving stall angle of attack, the maximum angle of attack setting is increased to track the now-improving stall angle of attack (see FIGS. 6, 7, segment 102-D). The tracking is not, in illustrative embodiments, based on actual detection or observation of the improving stall angle of attack, but is instead based on known performance and effectiveness of the deicing system in preventing further ice accretion and melting any existing ice accretions. The system thus models the deicing behavior of the protected areas of the aircraft over time (and thus the improvement of the stall angle of attack with deicing) and uses this model to gradually increase the maximum angle of attack setting during the time period T3.

Although the anti-ice system 230 prevents new ice from accreting on the protected parts of leading edges of the wings, ice will continue to accrete on the unprotected surfaces of the aircraft. Such accretion can occur over some period of time during T4, gradually deteriorating the aerodynamic characteristics of the aircraft. After T4 time interval, the system now operates at a stable "normal ice operation" maximum angle of attack setting 45 (102-E).

As a result, this non-limiting technology reduces the impact on operational landing speeds 36 when the aircraft is flying under icing conditions, resulting in improved landing performance 37.

Example Time Varying Functions

The ice detection signal is received by a Stall Warning/Protection processor from ice detectors 230. This activates a Real Time Clock ("RTC") timer of the processor of Stall Warning or Stall Protection System, e.g., based on a periodic quartz crystal oscillator time base, that keeps track of elapsed time since ice was first detected.

The elapsed time serves as input for the processors' arithmetic and logic unit ("ALU"), which retrieves or generates values of changing maximum angles of attack settings based on instructions and/or data stored in non-transitory memory. The maximum angle of attack setting is dependent on elapsed time from Real Time Clock timer, and changes to predict the effect of deicing system 230 in reducing ice accretions on the leading edges of the wings and other protected areas of the aircraft, as discussed above. These stored or generated values of maximum angles of attack settings preferably have been tested in wind tunnels and in icing flight conditions to ensure that the aircraft is adequately protected from entering aerodynamic stall.

FIG. 8 is a non-limiting example of prestored tested maximum angle of attack setting values and their correspondence to the elapsed time intervals measured by the RTC timer. In more detail, FIG. 8 defines data structure N (stored in a memory such as RAM or ROM) indexed by time intervals 102' represented by 102-A-102-N, and N corresponding maximum angles of attack setting values each of which correlates to a corresponding time interval. The values are retrieved in sequence and used to protect against stall upon the Stall Warning/Protection processor receiving an ice detection signal.

Such processing as described above can be performed by a general or special purpose processor executing software instructions from non-transitory memory, or by a gate array, ASIC or other hardware array, or by a combination of hardware and software.

All publications cited herein are incorporated by reference.

While the non-limiting technology has been described in connection with what is presently considered to be the most practical and preferred embodiments, it is to be understood that the non-limiting technology is not to be limited to the disclosed embodiments. For example, while a piecewise linear function is used in the example non-limiting embodiments to track/model stall angle of attack, curved or other higher order functions could be used instead. Similarly, while the example non-limiting embodiments make adjustments based on the detected presence of icing but not based on measured severity or magnitude of icing, other embodiments could take into account the ambient air temperature, air moisture, accreted ice thickness and/or other factors to predict or measure the rate of ice accretion and/or the rate at which the deicing system can melt or is melting accreted ice. On the contrary, the disclosed technology is intended to cover various modifications and equivalent arrangements included within the spirit and scope of the appended claims.

The invention claimed is:

1. For use in an aircraft including a deicer operative to deice in response to detected icing, a stall warning and/or protection system comprising:
   at least a first sensor configured to detect icing;
   at least a second sensor configured to detect at least one parameter indicative of angle of attack; and
   a computer, operatively coupled to the first sensor and second sensor, the computer being configured to apply a function dependent on the time at which the first sensor detects icing, the function adapting a maximum angle of attack parameter to track rate of deicing,
   wherein the function is a time varying function, and the rate of deicing, to which the time varying function adapts the maximum angle of attack parameter, is defined at least in part by a stored deicing model that at least in part models deicing effect of the deicer.

2. The system of claim 1, wherein the first and second sensors are configured to provide signals indicating physical properties to the computer, and the computer is configured to perform a set of steps based on its internal architecture and/or software structure that compares the signals from the sensors, and conditionally outputs a signal comprised of data relevant to Stall Warning and Stall Protection.

3. The system of claim 1 wherein the computer continuously or continually modifies the maximum angle of attack parameter according to how much time has elapsed since ice was detected by the first sensor and/or the deicer was activated.

4. The system of claim 1 wherein the computer adapts the maximum angle of attack parameter to maintain approximately a constant angle-of-attack margin to a stall angle of attack.

5. The system of claim 4 wherein the computer takes into account improvements in the stall angle of attack due to inflight icing removal and icing prevention by operation of the deicer during flight, the aircraft flying with an angle of attack close to a critical angle of attack and thus being capable of producing a high coefficient of lift.

6. The system of claim 1 wherein the deicer requires some time after activation before it reaches thermal equilibrium at an adequate temperature to keep protected surfaces of the aircraft ice free.

7. The system of claim 1 wherein the stored deicing model is constructed empirically through tests in wind tunnels and flights in icing conditions.

8. The system of claim 1 wherein the computer decreases the maximum angle of attack parameter as a stall angle of attack degrades due to the ice accretions, and increases the maximum angle of attack parameter as the stall angle of attack improves due to deicing.

9. The system of claim 1 wherein the computer increases the maximum angle of attack parameter to track the improving stall angle of attack as the deicer melts ice, and the tracking is based on operating characteristics of the deicer in preventing further ice accretion and melting existing ice accretions.

10. A system for reducing the operational impacts of flying in icing conditions, comprising:
at least a first sensor configured to detect icing;
at least a second sensor configured to detect at least one parameter indicative of angle of attack; and
a computer, operatively coupled to the first sensor and second sensor, the computer being configured to apply a function of time after the first sensor detects icing that adapts a maximum angle of attack parameter to track a rate of deicing,
wherein the computer is configured to define the maximum angle of attack parameter as a function of time based at least in part on a deicing model that defines an expected deicing rate.

11. The system of claim 10, wherein the computer is configured to compare the function of time with a value responsive to the sensed parameter.

12. The system of claim 11, wherein the computer compares stored values and measured values, and if measured values compare unfavorably with stored values, sends a signal to a stall protection and warning system.

13. A system for reducing the operational impacts of flying in icing conditions, comprising:
at least a first sensor configured to detect icing;
at least a second sensor configured to detect at least one parameter indicative of angle of attack; and
a computer, operatively coupled to the first sensor and second sensor, the computer being configured to apply a function of time after the first sensor detects icing that adapts a maximum angle of attack parameter to track a rate of deicing,
wherein the computer is configured to keep the angle of attack margin substantially constant, but not limited to, once the first sensor detects ice in order to reduce the aircraft's operational speeds throughout phases of flight in response to predicted rate of deicing.

14. An aircraft, comprising:
an ice sensor producing an ice detection signal;
an angle of attack sensor producing an angle of attack signal;
a deicer; and
a processor coupled to the ice sensor and the angle of attack sensor, the processor predicting how deicing by the deicer will reduce icing over time and adapt an angle of attack margin in response to the prediction;
the processor producing a stall protection and/or warning signal based on comparing the adapted angle of attack margin to the angle of attack signal,
wherein the processor adapts the margin based on the time since the ice sensor first produced the ice detection signal and the predicted rate at which the deicer will remove ice over time.

15. The aircraft of claim 14, wherein the aircraft has a nose and is configured to automatically move its nose down automatically in response to the stall protection signal.

16. The aircraft of claim 14, wherein the processor provides fly-by-wire control of at least one control surface of the aircraft in response to the stall protection signal.

17. The aircraft of claim 14, wherein the processor determines the adapted margin in response to a lookup table indexed by time since the ice sensor first produced the ice detection signal.

18. An aircraft, comprising:
an ice sensor producing an ice detection signal;
an angle of attack sensor producing an angle of attack signal;
a deicer; and
a processor coupled to the ice sensor and the angle of attack sensor, the processor predicting how deicing by the deicer will reduce icing over time and adapt an angle of attack margin in response to the prediction;
the processor producing a stall protection and/or warning signal based on comparing the adapted angle of attack margin to the angle of attack signal,
wherein the processor calculates the adapted margin in response to the time that has elapsed since the ice sensor first detected icing, which time is correlated to predicted deicing rate.

19. The aircraft of claim 18 wherein the processor increases a maximum angle of attack parameter to track an improving stall angle of attack as the deicer melts ice, and the tracking is based on operating characteristics of the deicer in preventing further ice accretion and melting existing ice accretions.

20. The aircraft of claim 19 wherein the processor models deicing behavior of protected areas of the aircraft over time and thus improvement of a stall angle of attack with deicing, and uses the model to gradually increase a maximum angle of attack setting.

* * * * *